(12) United States Patent
Watanabe et al.

(10) Patent No.: US 9,546,736 B2
(45) Date of Patent: Jan. 17, 2017

(54) TRUNNION BALL VALVE FOR HIGH PRESSURE, AND HYDROGEN STATION

(71) Applicant: KITZ CORPORATION, Chiba (JP)

(72) Inventors: Osamu Watanabe, Yamanashi (JP); Tetsuya Watanabe, Yamanashi (JP)

(73) Assignee: KITZ CORPORATION, Chiba (JP)

( * ) Notice: Subject to any disclaimer, the term of this patent is extended or adjusted under 35 U.S.C. 154(b) by 131 days.

(21) Appl. No.: 14/378,722

(22) PCT Filed: Feb. 28, 2013

(86) PCT No.: PCT/JP2013/055367
§ 371 (c)(1),
(2) Date: Aug. 14, 2014

(87) PCT Pub. No.: WO2013/129560
PCT Pub. Date: Sep. 6, 2013

(65) Prior Publication Data
US 2016/0025231 A1    Jan. 28, 2016

(30) Foreign Application Priority Data

Feb. 28, 2012  (JP) ................................ 2012-041912
Aug. 31, 2012  (JP) ................................ 2012-192124

(51) Int. Cl.
*F16K 5/06*       (2006.01)
*F16K 5/22*       (2006.01)
(Continued)

(52) U.S. Cl.
CPC ........... *F16K 5/0663* (2013.01); *F16K 5/0636* (2013.01); *F16K 5/0647* (2013.01); *F16K 5/0657* (2013.01);
(Continued)

(58) Field of Classification Search
CPC .... F16K 5/0647; F16K 5/0657; F16K 5/0636; F16K 5/227; F16K 5/201; F16K 25/006; F16K 27/067; F16K 31/60; F16K 5/0663
(Continued)

(56) References Cited

U.S. PATENT DOCUMENTS 3,047,007 A *  7/1962  Lunken ................. F16K 5/0668
                                                              137/315.21
5,127,628 A    7/1992  Kemp
(Continued)

FOREIGN PATENT DOCUMENTS

JP    2-286973    11/1990
JP    7-501127    2/1995
(Continued)

OTHER PUBLICATIONS

International Search Report (ISR) issued Jun. 4, 2013 in International (PCT) Application No. PCT/JP2013/055367.

*Primary Examiner* — Marina Tietjen
(74) *Attorney, Agent, or Firm* — Wenderoth, Lind & Ponack, L.L.P.

(57) ABSTRACT

A trunnion ball valve includes a ball provided inside a body main unit in a freely rotatable manner; and a seal mechanism provided on positions on both sides of the ball so as to be in seal contact with the ball, the seal mechanism including: a seat retainer having a sealing surface that is to be in seal contact with a ball surface of the ball; a spring member provided for applying elastic force on a sealing surface side; and a sealing member provided on an outer surface of the seat retainer.

16 Claims, 10 Drawing Sheets

(51) Int. Cl.
   *F16K 27/06*   (2006.01)
   *F16K 31/60*   (2006.01)
   *F16K 5/20*    (2006.01)
   *F16K 25/00*   (2006.01)

(52) U.S. Cl.
   CPC ............ *F16K 5/0668* (2013.01); *F16K 5/201* (2013.01); *F16K 5/227* (2013.01); *F16K 25/005* (2013.01); *F16K 27/067* (2013.01); *F16K 31/60* (2013.01)

(58) Field of Classification Search
   USPC .................................................. 251/315.01
   See application file for complete search history.

(56) References Cited

U.S. PATENT DOCUMENTS

| | | | | |
|---|---|---|---|---|
| 5,848,613 | A * | 12/1998 | Sakaguchi | F15B 13/0402 137/625.65 |
| 8,146,889 | B2 * | 4/2012 | Hunter | F16K 3/02 251/326 |
| 2010/0200791 | A1 | 8/2010 | Yung et al. | |

FOREIGN PATENT DOCUMENTS

| JP | 8-178091 | 7/1996 |
|---|---|---|
| JP | 8-261338 | 10/1996 |
| JP | 2004-76884 | 3/2004 |
| JP | 2007-535648 | 12/2007 |
| JP | 2011-1598 | 1/2011 |
| JP | 2011-174569 | 9/2011 |
| JP | 2012-13141 | 1/2012 |

* cited by examiner

TRUNNION BALL VALVE FOR HIGH PRESSURE, AND HYDROGEN STATION

TECHNICAL FIELD

The present invention relates to a ball valve, in particular, a trunnion ball valve for high pressure suitable for use in a facility such as a hydrogen station in which high-pressure fluid such as hydrogen flows, and further relates to a hydrogen station.

BACKGROUND ART

In recent years, together with the reviewing of energy policies, strong promotions have been made to spread supply infrastructure of hydrogen stations for fuel cell vehicles. In piping facilities in which high-pressure fluid flows such as a hydrogen station, for example, in a case of hydrogen, hydrogen reaches a high pressure of 80 MPa or more. Therefore, a valve for high-pressure fluid is used. As a valve for flowing such a high-pressure fluid, for example a needle valve disclosed in Patent Document 1 is known. The needle valve has a structure in which a flow channel opens and closes by reciprocation movement of a needle.

Meanwhile, a trunnion ball valve may be used as a valve suitable for a case in which a flow channel is switched on or off while maintaining its flow. A known ball valve of this type is, for example, a trunnion ball valve of Patent Document 2. This trunnion ball valve is structured so that a ball made of metal is provided inside a body in a rotatable manner via a stem and a trunnion (lower stem), and a seat retainer is provided in which a ball seat for sealing is provided on both sides of the ball. Such a valve for high pressure requires maintaining high sealing performance to securely prevent leakage. Furthermore, in order to secure operability of the valve under high pressure, it is also necessary to satisfy sliding ability between the stem and the seat.

One example of a trunnion ball valve for high pressure gas for improving sealing performance between the ball and the seat is a ball valve disclosed in Patent Document 3. In order to improve the sealing performance between the ball and the seat under high pressure, this ball valve has diamond-like carbon deposited on the ball on a surface with which the seat is in contact.

Moreover, Patent Document 4 discloses a solenoid valve as a valve on which a film formed by diamond-like carbon is provided. The solenoid valve has a coating film formed on at least one sliding surface of an inner surface of a valve casing or an outer surface of a ball. Diamond-like carbon is used as the coating film, to improve the sliding ability.

PRIOR ART DOCUMENT

Patent Document

Patent Document 1: Japanese Translation of PCT International Application Publication No. JP-T-2007-535648
Patent Document 2: Japanese Unexamined Patent Application No. 2012-13141
Patent Document 3: Japanese Unexamined Patent Application No. 2004-76884
Patent Document 4: Japanese Unexamined Patent Application No. 2011-174569

Problem to be Solved by the Invention

However, in a case of flowing hydrogen in a hydrogen station with use of a needle valve such as the one disclosed in Patent Document 1, pressure loss caused by the high pressure of the hydrogen becomes great. As a result, a problem arises that it takes a long time to fill the station with hydrogen.

On the other hand, with a trunnion ball valve for high-pressure fluid, it is important to particularly improve both the sliding ability and the sealing performance between the ball and the seat. In this case, if resin material such as PEEK (polyetheretherketone) or PTFE (polytetrafluoroethylene) that are commonly used to secure sliding ability is used as the material for the seat in the ball valve of Patent Document 2, the sealing performance may not be secured due to easiness of the soft resin material in being damaged under high pressure. As such, in order to maintain sealing performance under high pressure, it is necessary to improve the hardness of a sealing section or a sealing surface, also in terms of durability.

Patent Document 3 attempts to maintain sealing ability (sealing performance) while high pressure gas is flown by improving durability, by depositing diamond-like carbon only to the contact surface of the ball with the seat. However, although the sealing ability of this ball valve is improved, sliding ability between the ball and the seat may drop due to the increase in adherence between the ball and the seat.

In a solenoid valve of Patent Document 4, the sliding ability is improved by forming a coating film of diamond-like carbon on a sliding surface of an inner surface of a valve casing and an outer surface of a ball. However, no disclosure nor suggestion is made as to this solenoid valve regarding improvement in the sealing performance of a valve seat.

Furthermore, in the valve for high-pressure fluid, the ball is strongly pressed against a secondary side due to the high-pressure fluid. For example, in a case of applying a fluid pressure of 90 MPa, with a ball valve having a nominal diameter of $9/16$ (port diameter of 6.4 mm), a load of approximately 1 t is applied to the ball. In this case, a stem is connected to the ball, and the stem is sealed by a packing. Therefore, when the ball is strongly pushed to the secondary side, the stem may also incline to the secondary side in a structure in which the ball and the stem are connected substantially as one. As a result, there is a fear that sealing ability by the packing is lost.

Moreover, in a structure as in Patent Document 2 in which a columnar shaft is provided vertically to the ball, the ball is supported in a rotatable manner by a bearing (ball bearing) in which an outer periphery of the shaft is stacked. However, in a case in which a fluid with high pressure such as 90 MPa is supplied, the vicinity of a spherical part of the ball is most strongly pushed to the secondary side. As a result, the ball bearing disposed in the vicinity of the spherical part may break.

SUMMARY OF THE INVENTION

The present invention was developed in order to solve the above issues, and an object thereof is to provide a trunnion ball valve for high pressure and a hydrogen station that is particularly suitable for high-pressure fluid, in which valve sliding ability between a ball and a valve seat is improved to realize a low torque during operation, while improving sealing performance to exhibit extremely high sealing ability and with improved durability so as to allow maintaining of the sealing ability for a long period of time.

Means to Solve the Problem

In order to obtain the aforementioned object, an invention according to claim 1 is a trunnion ball valve for high pressure, comprising: a ball provided inside a body main unit in a freely rotatable manner; and a seal mechanism provided on positions on both sides of the ball so as to be in seal contact with the ball, the seal mechanism comprising: a seat retainer having a sealing surface that is to be in seal contact with a ball surface of the ball; a spring member provided for applying elastic force on the sealing surface side; and a sealing member provided on an outer surface of the seat retainer, at least both of the sealing surface of the seat retainer and the ball surface with which the sealing surface is to be in contact having a coating layer of diamond-like carbon provided thereon, so as to exhibit sliding ability and sealing performance.

An invention according to claim 2 is a trunnion ball valve for high pressure wherein the sealing surface of the seat retainer is set at a position deviated from a spherical diameter center of the ball surface so as to have a slightly longer radius than a radius of the ball surface, and the sealing surface has a sealing position with the ball surface at a substantially center position of the sealing surface.

An invention according to claim 3 is a trunnion ball valve for high pressure wherein the sealing surface of the seat retainer has one part of a drawn semispherical surface serve as a trajectory surface, the semispherical surface drawn to have a slightly longer radius than that of the ball surface, the slightly longer radius being a length from a point deviated from a spherical diameter center of the ball surface along a Y-axis direction by a predetermined distance, at an angle 180° in a direction opposite to a side to which the point is deviated, the Y-axis running orthogonally to an X-axis that runs in a flow channel direction of the ball.

An invention according to claim 4 is a trunnion ball valve for high pressure wherein the seat retainer has a base material hardness set higher than a base material hardness of the ball.

An invention according to claim 5 is a trunnion ball valve for high pressure wherein the base material of the seat retainer is BeCu alloy metal, and the base material of the ball is stainless steel.

An invention according to claim 6 is a trunnion ball valve for high pressure wherein either one or both of the sealing surface and the ball surface has a conforming layer provided on a surface of the coating layer.

An invention according to claim 7 is a trunnion ball valve for high pressure wherein the ball has an upper shaft section and a lower shaft section provided in an integrated manner, the ball being provided on an outer periphery of the upper and lower shaft sections in a freely rotatable manner via a radial bearing, and the ball being provided in a freely rotatable manner via a rotational force of a stem that is joined to the shaft section, the stem having on a lower end thereof a parallel two-surface groove on which a parallel two-surface section provided on an upper end of the upper shaft section is provided to work in connection therewith, and when the ball is pressed by high-pressure fluid while the valve is closed, the ball having the upper and lower shaft sections is supported in a perpendicular state in a secondary direction.

An invention according to claim 8 is a trunnion ball valve for high pressure wherein the radial bearing is a member in which an inner peripheral surface of a rigid cylindrical body is coated with polytetrafluoroethylene.

An invention according to claim 9 is a trunnion ball valve for high pressure wherein the trunnion ball valve is a manually operated ball valve to which a handle for manual operation is provided on the upper end of the stem, or is an automatically operated ball valve in which the upper end of the stem is connected to an actuator installed in the body main unit for automated operation.

An invention according to claim 10 is a hydrogen station comprising a trunnion ball valve for high pressure in a supply line for high pressure hydrogen.

Effect of the Invention

According to the invention of claim 1, it is possible to provide a ball valve of a trunnion type structure suitable for high-pressure fluid in particular. By providing a coating layer of diamond-like carbon to at least both of a sealing surface of a seat retainer and a ball surface, sliding ability of a valve element with a valve seat is improved, to realize a low torque during operation, while also improving sealing performance to exert extremely high sealing ability thereby improving durability that allows maintaining of the sealing ability for a long period of time. Further, the valve element can be operated under high pressure while possessing both these properties. As a result, even if a spring constant of the spring member is reduced, it is possible to easily operate the valve element manually with excellent operability, while securely preventing leakage of the high-pressure fluid by autofrettage force caused by the ball valve in the trunnion structure for high-pressure fluid.

According to the invention of claim 2 or 3, it is possible to seal by making the ball surface and the sealing surface be in contact with each other by line contact or surface contact that tolerates to amplitude. This allows for improving low torque while securely maintaining sealing performance between the ball surface and the sealing surface in a minimum contact area required. Furthermore, by sealing the sealing surface with the ball surface at a position center of the sealing surface, the ball surface can pressure weld to the sealing surface in a pressure equalized state, which state improves the sealing ability and allows for securely preventing leakage.

According to the invention of claim 4, durability is improved by maintaining the diamond-like carbon layer, particularly by the increase in hardness of the seat retainer, and even in a case in which the seat retainer is of a thin-wall tubular shape, any damage thereto is prevented, thereby maintaining a high sealing ability. Furthermore, even in the unlikely event that the diamond-like carbon wears out, a minimum degree of sliding ability is secured by difference in hardness between base materials. As a result, the sealing ability can be maintained for a long period of time, and durability is improved. As such, by providing a seat retainer having high hardness under the diamond-like carbon coating layer, fail safe function is exhibited and leakage of high pressure hydrogen is securely prevented.

According to the invention of claim 5, by having the base material of the seat retainer be made of BeCu alloy that is made of copper based alloy, durability against hydrogen is improved. Improvement in strength of the seat retainer contributes to integrity of the diamond-like carbon, thereby improving both of the sliding ability and the sealing performance. Furthermore, by setting the difference in hardness between the seat retainer and the base material into an optimum state, even in the event that the diamond-like carbon coating layer supposedly wears out, leakage is prevented by a beryllium layer of the seat retainer. In addition, since the seat retainer is made of copper alloy, galling of the seat retainer by the ball is prevented, thereby avoiding malfunctioning.

According to the invention of claim 6, by providing a conforming layer on a surface of the coating layer provided on at least one or both of the sealing surface and the ball surface, conformability between the sealing surface and the ball surface is improved to prevent wearing caused by abrasion, and allows for improving sliding ability. Since the conforming layer improves adhesion, the sealing ability also improves.

According to the invention of claim 7, a constant position of an inside diameter sealing member, which member is a packing for the stem sealing, is securely maintained, thereby exhibiting sealing functions effectively. That is to say, the ball having the upper and lower shaft sections is made to be supported in a secondary direction in a perpendicular state. Therefore, the ball is capable of moving slightly parallel along a flow channel direction, along a parallel two-surface groove. This allows for securely preventing a slight parallel movement when a high pressure is applied while the valve is closed, thereby causing load to be received by the ball in the flow channel direction. Alternatively, it is possible to securely prevent an inclination phenomenon in a case in which the ball is deformed due to receiving the high load. Therefore, it is possible to maintain durability and torque even in a case in which rotational operation of the ball is repeatedly carried out, thereby maintaining high sealing ability of the stem with use of the inside diameter sealing member.

According to the invention of claim 8, even in a case in which excess force is applied to the ball in a radial direction by the high-pressure fluid, torque is maintained by the radial bearing. Further, even in a case in which rotational operation is repeatedly carried out, sliding resistance is small and the sliding ability is further improved by soft polytetrafluoroethylene. This improves the durability of the ball and prevents deterioration thereof.

According to the invention of claim 9, it is possible to rotatably operate the ball by manual operation or automated operation, and can be established by selecting appropriate operations in accordance with use conditions such as a pressure and type of high-pressure fluid, location to be established and the like.

According to the invention of claim 10, a hydrogen station includes a trunnion ball valve for high pressure that realizes low torque during operation, which ball valve exhibits extremely high sealing ability by improving sealing performance and can improve durability that allows for maintaining sealing ability for a long period of time, and the hydrogen station can be operated under high pressure while maintaining both these properties. Accordingly, it is possible to securely prevent leakage of high-pressure fluid by exhibition of autofrettage force due to the ball valve, and by easy valve element operation automatically or manually attained by the excellent operability, flow channel is switched, thereby allowing supplying of a predetermined amount of hydrogen or stopping the supply of hydrogen. In particular, it is possible to significantly reduce frequency of carrying out maintenance to the hydrogen station.

EMBODIMENT OF THE INVENTION

Figure 1:
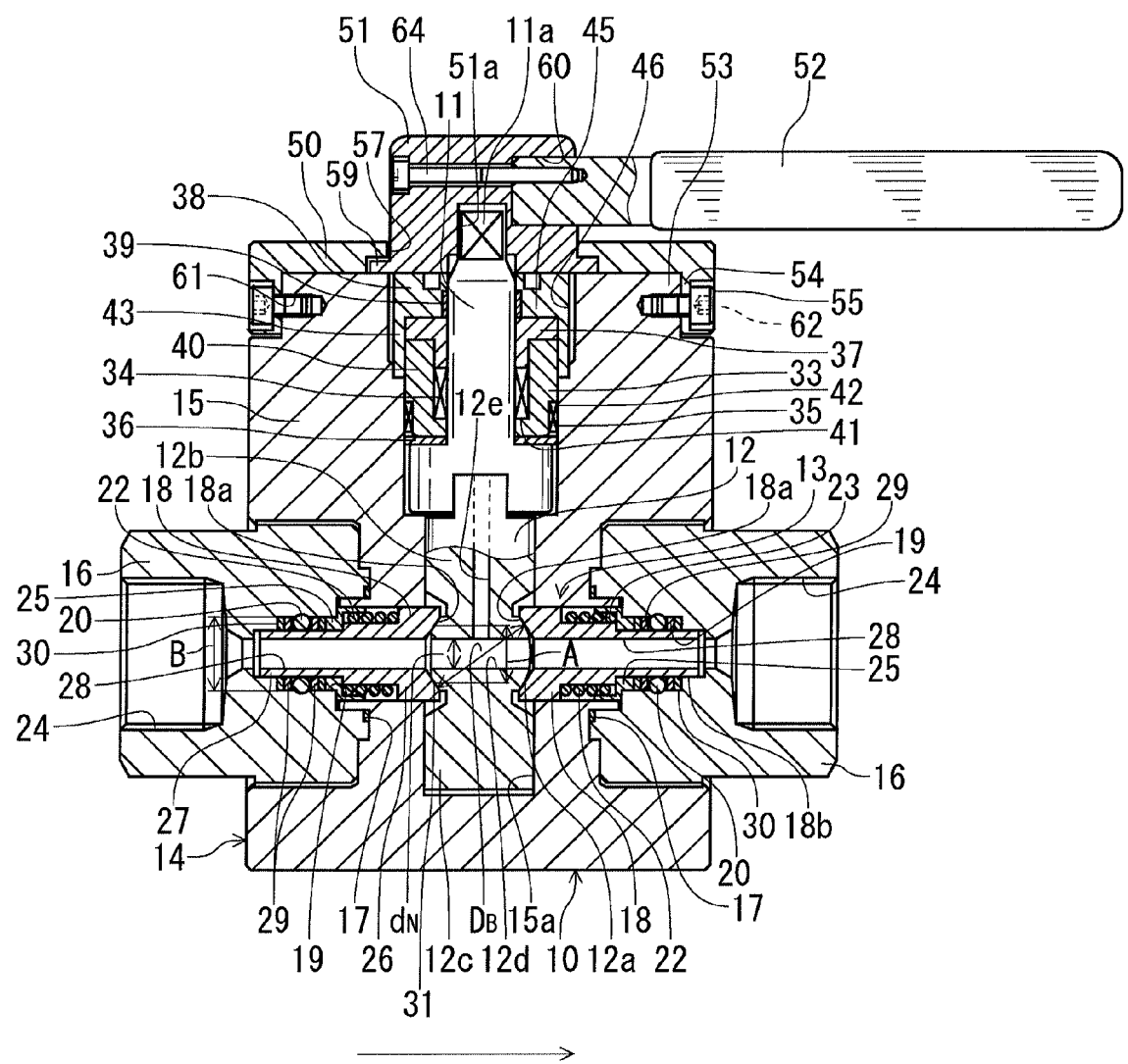
FIG. 1 is a longitudinal sectional view illustrating one embodiment of a trunnion ball valve for high pressure of the present invention.

Described in detail below is an embodiment of a trunnion ball valve for high pressure of the present invention, with reference to drawings. FIG. 1 illustrates one embodiment of a trunnion ball valve for high pressure of the present invention, and FIG. 2 illustrates an exploded cross sectional view of FIG. 1.

Figure 2:
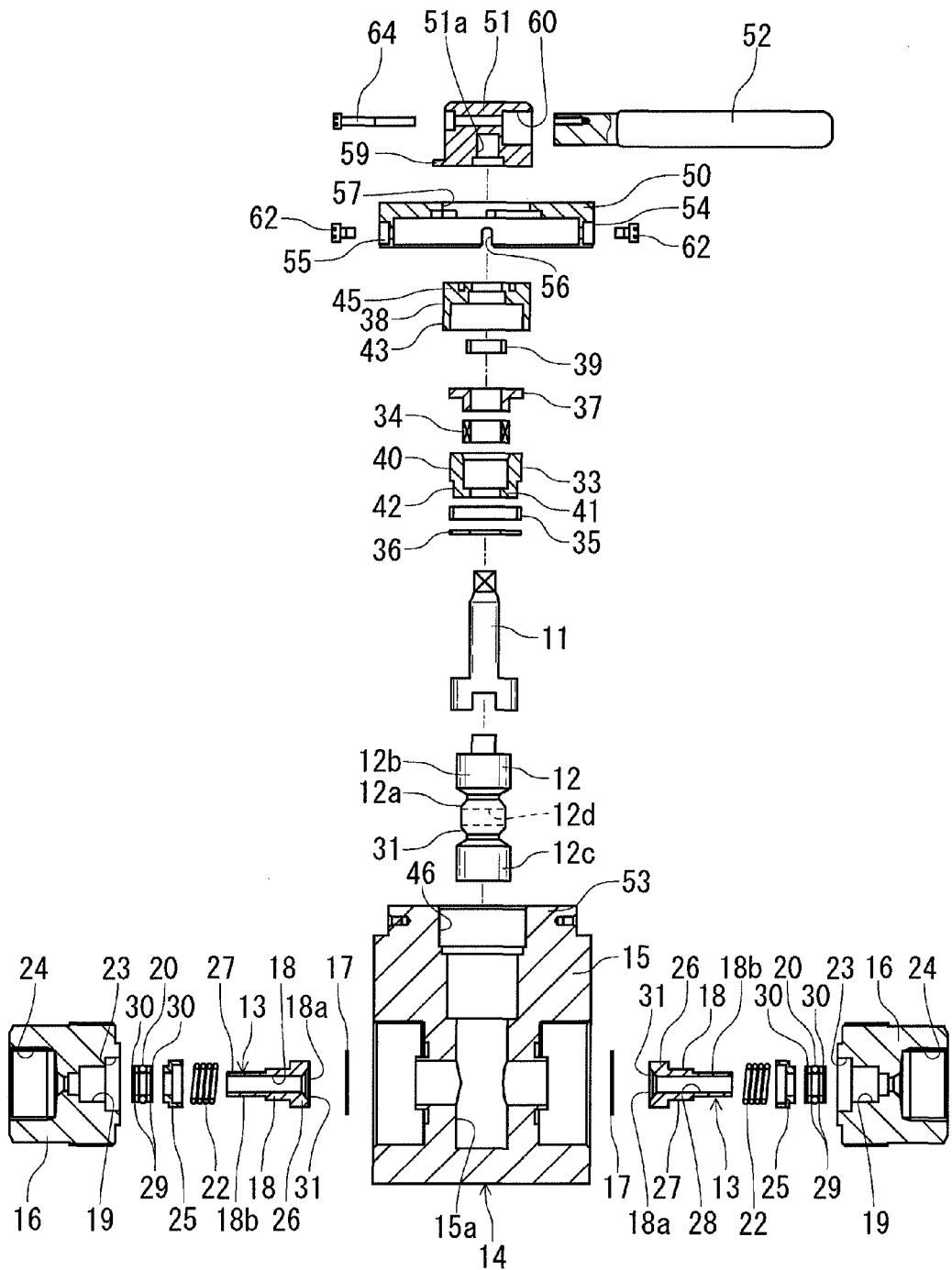
FIG. 2 is an exploded cross sectional view of the trunnion ball valve for high pressure illustrated in FIG. 1.

As illustrated in FIG. 1 and FIG. 2, a ball valve main unit (hereinafter referred to as valve main unit) 10 of the present invention includes a ball 12 serving as a ball, in a rotatable manner via a stem 11, and a seal mechanism 13 disposed on both sides of the ball 12 for providing seal contact with the ball 12, and has a configuration of a trunnion ball valve particularly suitable for flowing high-pressure fluid therein.

The valve main unit 10 includes a body main unit 14. The body main unit 14 includes a body 15 and cap members 16, 16, which are provided on a primary side and a secondary side of the body 15, respectively. The ball 12 and the seal mechanism 13 are disposed inside the body main unit 14. High pressure in the present embodiment is for example 35 MPa or higher, and is assumed to be from 70 to 105 MPa, more specifically 90 MPa in piping facilities for a hydrogen station.

The body 15 is formed in a substantially quadrangular shape. The cap members 16, 16 are screwed onto both sides of the body 15 via screwing sections 16a, respectively, in a state in which a gasket 17 is sandwiched between the body 15 and the cap members 16, 16. This constitutes the body main unit 14. The cap members 16 have on its inner peripheral surface a mounting hole 19 for mounting the seat retainer 18, and the mounting hole 19 is opened so as to enable insertion of the seat retainer 18. Furthermore, the mounting hole 19 can mount a sealing member 20.

Moreover, the mounting hole 19 has a diameter expanded groove section 23 that has a diameter more expanded than that of the mounting hole 19, and a spacer 25 shaped in a substantially tubular shape is provided between the diameter expanded groove section 23 and a spring member 22 later described. The spring member 22 is provided in an elastic state between the spacer 25 and the seat retainer 18. On the other side of the mounting hole 19, an internal thread section 24 is formed in communication with the mounting hole 19. Into the internal thread section 24, an external joint not illustrated can be screwed. It should be noted that the cap members 16 can be integrated with the body 15 by bonding means such as adhesion or welding.

The ball 12 is made of stainless steel such as SUS316 as its base material. The ball 12 has a ball surface 12a, and the seat retainer 18 can be sealed onto the ball surface 12a. The ball 12 has a shaft section (upper shaft section) 12b at an upper part thereof and a trunnion (lower shaft section) 12c at a lower part thereof, and the ball 12 is made rotatable by applying the upper shaft section 12b and the lower shaft section 12c in an application hole 15a of the body 15. In a case in which the ball 12 is operated in a rotating manner by the stem 11, fluid flows while a communication hole 12d formed inside the ball 12 communicates with an inner flow channel 28 formed inside the seat retainer 18. In a case in which the base material of the ball 12 is SUS316, Vickers hardness is Hv200 or less. In a case in which the ball 12 is made of stainless steel, the ball 12 is a water contact part, so therefore it is preferable to use materials that do not become brittle by hydrogen.

Inside the upper shaft section 12b of the ball 12, a pressure equalizing hole 12e is opened that communicates from the communication hole 12d to the upper surface of the ball. Through this pressure equalizing hole 12e, pressure within the cavity while the valve is opened can be released.

The seal mechanism 13 is made up of the seat retainer 18, the spring member 22 and the sealing member 20.

The seat retainer 18 is made of copper based alloy such as BeCu alloy (beryllium copper alloy) serving as base material thereof. In a case in which, in particular, BeA-25 (beryllium copper) to which solution treatment, cold working and hardening treatment (heat treatment) are carried out is used as the base material of the seat retainer 18, sealing ability is exhibited as a result of containing a relatively soft copper component while the strength of stainless steel SUS630 or more is maintained. In the case in which the base material of the seat retainer 18 is beryllium copper, the Vickers hardness after carrying out the heat treatment is in a range of Hv 360 to 450, and mechanical property of beryllium copper is, for example, a tensile strength of 1200 to 1500 MPa, and 0.2% proof stress of 1000 to 1400 MPa. In the case in which the seat retainer is made of copper based alloy, embrittlement caused by hydrogen will also be prevented.

When forming the seat retainer 18, it is preferable to polish the sealing surface 18a, which surface is a side to be in contact with the ball surface 12a.

In the present embodiment, base material hardness of the seat retainer 18 is set higher than base material hardness of the ball 12, and satisfies the following relationship: "hardness of diamond-like carbon">"base material hardness of seat retainer">"base material hardness of ball". Accordingly, even if diamond-like carbon (DLC) later described is worn, the difference in hardness between DLC of the ball surface 12a and the base material of the seat retainer 18, or alternatively, in the event of exhaustion of DLC of the ball surface 12a, the difference in hardness between the base material of the ball and the base material of the seat retainer allows for maintaining a minimum required sliding ability without occurrence of what is called "galling", thereby obtaining a durable ball valve capable of maintaining sealing ability for a long period of time. In the present embodiment, the sealing ability is more maintained by use of BeCu for the seat retainer 18, as described above. That is to say, with the double or triple settings of providing DLC, providing a difference in hardness between the base material of the seat retainer 18 and that of the base material of the ball 12, and having the base material of the seat retainer 18 be BeCu alloy, fail safe measures are taken so that high pressure hydrogen does not leak.

It should be noted that depending on its purpose, the base material hardness of the ball can be set the same or higher than the base material hardness of the seat retainer.

Specifically, the seat retainer 18 is shaped to have a diameter expanded section 26 disposed so as to face the ball 12, and a tube section 27 having a smaller diameter than the diameter expanded section 26. As described above, the sealing surface 18a is provided on the diameter expanded section 26 on the surface facing the ball 12, and the sealing surface 18a and the ball surface 12a can be in contact in a sealing manner. As long as the seat retainer 18 can exhibit the function as a sliding component, the base material of the seat retainer 18 can be copper alloy such as aluminum bronze or material other than copper based alloy. In the present embodiment, BeCu alloy having high mechanical property is used in order to prevent deformation thereof, since the tube section of the seat retainer 18 that is a pressure resistant sliding component has a small diameter and a thin wall.

Figure 3:
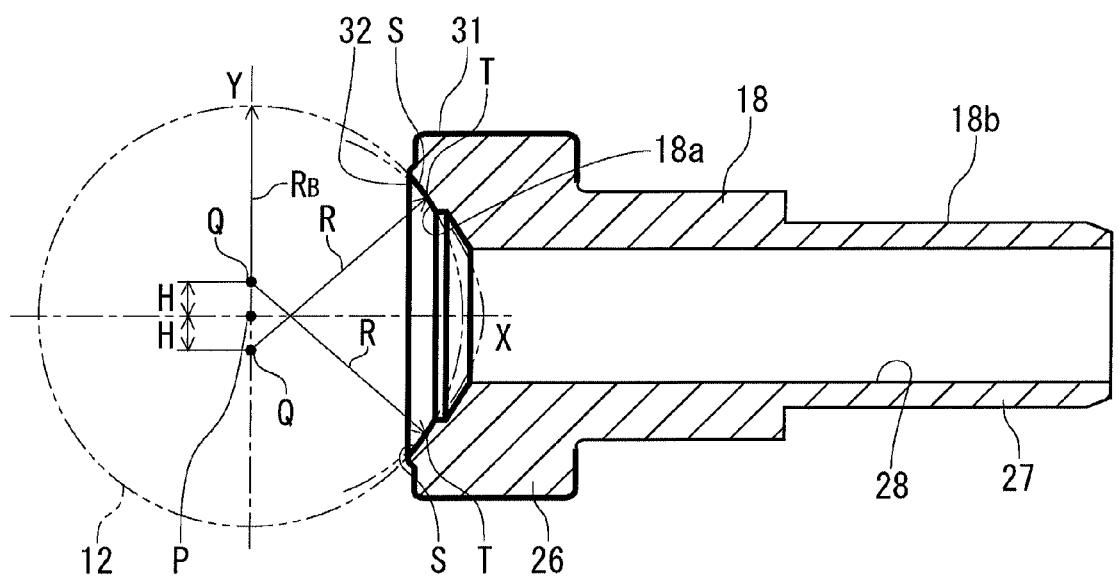
FIG. 3 is a longitudinal sectional view of a seat retainer.

FIG. 3 describes a case of providing the sealing surface 18a of the seat retainer 18. The drawing provides an X-axis from a spherical diameter center P of the ball surface 12a in a flow channel direction of the ball 12, and a Y-axis intersecting the X-axis. Two deviation points (offset point) Q, Q are provided in the Y-axis direction from the spherical diameter center P, having a predetermined distance H between the two points. Semispherical surfaces S, S having a radius R slightly longer than a radius $R_B$ of the ball surface 12a are drawn from the offset points Q, Q in opposite directions to the deviation (offset) sides by an angle of 180°, to structure the sealing surface 18a having a part of the semispherical surface S serve as a trajectory surface. That is to say, in FIG. 4, the sealing surface 18a is a part of a trajectory of the slightly longer radius R of the ball surface 12a drawn from the offset points Q, Q of the predetermined distance H, and the sealing surface 18a is drawn based on the radius R.

At this time, the predetermined distance H of the offset points Q is set so that a sealing position T on the sealing surface 18a with the ball surface 12a comes in a substantially center position of the sealing surface 18a. As one example, in a case in which, in FIG. 1, an inner flow channel diameter $d_N$ of the ball 12 is 10 mm and a spherical diameter $D_B$ of the ball surface 12a is ϕ20 mm (radius $R_B$ is 10 mm), the offset point Q having the distance H be Δh is set as the slightly long radius R (radius $R_B$ Δr), and the trajectory surface is drawn from this offset point Q. The predetermined distance H from the spherical diameter center P of the offset point Q can be changed as appropriate in accordance with the spherical diameter of the ball surface 12a. In the present embodiment, it is set so as to satisfy the following relationship: Δr>Δh.

If supposedly the sealing surface 18a of the seat retainer 18 is set as a slightly longer radius than the ball surface 12a without providing the offset point Q, the ball 12 comes in contact with an inner peripheral part of the sealing surface 18a of the seat retainer 18. This causes the inner peripheral part to locally contact the ball surface 12a, thereby increasing the possibility of damaging DLC. In order to avoid this, a technique of rounding the inner peripheral part to avoid the local contact can also be considered. This however causes the shift in position of the ball 12 in the X-axis direction, and would cause new problems such as the need of narrowing the shaft section at an upper part of the ball 12.

In the present embodiment, by providing the offset point Q, the sealing position of the sealing surface 18a of the seat retainer 18 with the ball surface 12a is made to be positioned substantially center of the sealing surface. Additionally, sealing is carried out by surface contact sealing the seat retainer 18 with the ball 12, by carrying out a finishing process to the ball 12 prior to processing DLC.

Figure 4:
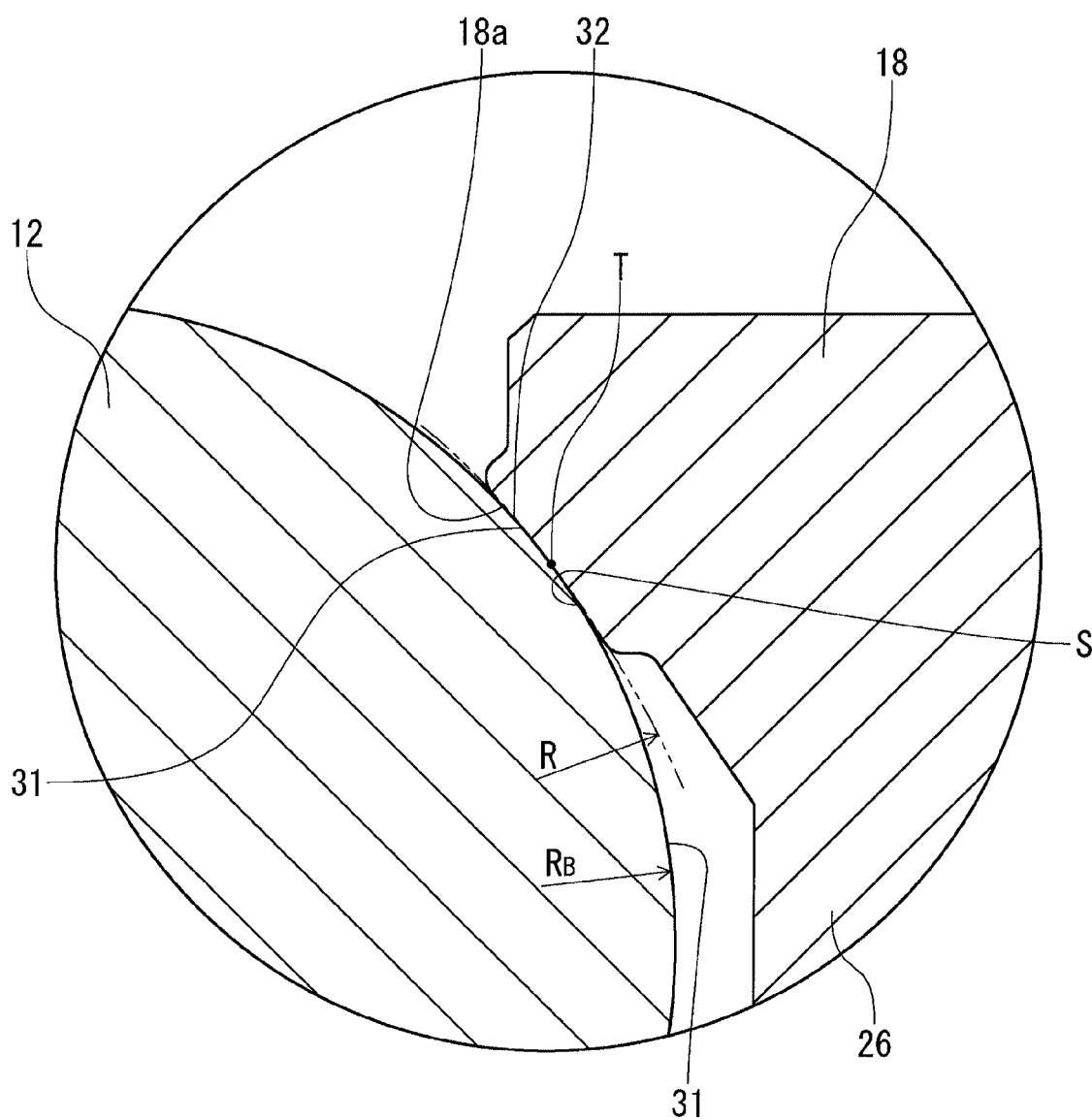
FIG. 4 is an exploded view of a main part illustrating a sealed state of a ball with a seat retainer.

The present invention has a sealing surface made to be in contact by line contact or surface contact. Although it is worded as line contact, in practice, the present invention forms a contacting sealing surface having a predetermined width. For example, a width of a surface contact seal is a ring-shaped fitted part formed substantially parallel to the Y-axis, and for example, has a width of approximately 0.5 mm. Since the trunnion ball valve of the present embodiment is for high pressure, the ball 12 changes in place due to the fluid pressure, however by setting the surface contact sealing width as described above, the ring-shaped fitted part is maintained. Furthermore, as illustrated in FIG. 4, the sealing position T is set at a substantially center position of the sealing surface 18a. Therefore, even if the position of the sealing position T shifts slightly during use of the ball valve, the ring-shaped fitted state will be maintained.

The sealing member 20 and back up rings 29 and 30 later described are arranged to the tube section 27 of the seat retainer 18. The tube section 27 is fitted into the mounting hole 19 of the cap members 16, to allow movement of the seat retainer 18 in the flow channel direction. The sealing member 20 is attached to an outer surface of the tube section 27 in an adhered state, and when the seat retainer 18 moves in the flow channel direction, the tube section 27 and the mounting hole 19 are sealed by the sealing member 20. Moreover, inside the seat retainer 18, an inner flow channel 28 in which high-pressure fluid flows is formed.

In an event of configuring a sealing part of the seat retainer 18 with the ball 12, a coating layer 31 made of diamond-like carbon is provided to at least both of the sealing surface 18a of the seat retainer 18 and the ball surface 12a that is in contact with the sealing surface 18a, to allow exhibition of sliding ability and sealing performance between the seat retainer 18 and the ball 12.

In this case, a conforming layer 32 is provided on the coating layer 31 of one or both of the sealing surface 18a and/or the ball surface 12a.

DLC is an amorphous hard film mainly made of hydrocarbon or an allotrope of carbon, has high hardness, and has excellent properties such as lubricity, wear and abrasion resistance, surface smoothness, and chemical stability. DLC can be deposited as a film by plasma CVD method or PVD method.

In a case in which DLC is provided by the plasma CVD method, source gas is made into a form of plasma inside a chamber with use of hydrocarbon gas such as acetylene, and vapor-phased hydrocarbon is deposited on the surface of the component. In this case, hydrogen is contained in the source, so therefore DLC will also contain hydrogen.

On the other hand, in a case in which DLC is provided by the PVD method, examples include a sputtering technique and an ion plating technique. In this case, graphite that serves as the source is exposed to ion beams, arc discharge, glow discharge and the like under vacuum, and dispersed carbon atoms are adhered to the surface of the component. In this method, DLC is provided just using carbon, thereby allowing providing a DLC free of hydrogen.

In a case in which hydrogen being a high-pressure fluid flows through the flow channel of the ball valve, there may be cases in which the hydrogen fluid infiltrates inside DLC of the coating layer 31. However, DLC of the present embodiment contains hydrogen, and thus DLC will not peel off from the base material.

In the case of providing DLC, the DLC process is carried out to the entire surface of the ball surface 12a for the ball 12, and to the thick lined parts illustrated in FIG. 3 for the seat retainer 18. In this case, it is preferable to have a sufficiently high Vickers hardness as compared to the base material of the seat retainer and ball, for example, in a range of HV 1500 to 3000, and DLC is to be provided with uniform thickness on a processing surface so as to have a film thickness of 2 to 3 μm. The conforming layer 32 is provided, if necessary, in an appropriate thickness.

A component on which the DLC coating layer 31 is provided is usable as a high surface pressure sliding component. Furthermore, by providing the conforming layer 32, initial conformability improves.

The spring member 22 in the seal mechanism is constituted of, for example, a coil spring, and is provided between the diameter expanded section 26 of the seat retainer 18 fitted inside the mounting hole 19, and a spacer 25. The spring member 22 applies elastic force in the sealing surface 18a direction of the seat retainer 18. The spring member 22 may also be a disc spring.

The sealing member 20 is constituted of, for example, a rubber O-ring, and is fitted into the mounting hole 19 together with the back up rings 29 and 30. As a result, the sealing member 20 is disposed between the mounting hole 19 on the body main unit 14 side and the sealing surface 18a of the seat retainer 18. The back up ring 29 disposed on the sealing member 20 side is formed by, for example, PTFE (polytetrafluoroethylene), and the back up ring 30 disposed on the outside of the back up ring 29 is formed of, for example, PEEK (polyetheretherketone).

Each of the sealing member 20 and the back up rings 29 and 30 may be made of material of different properties other than those described above, however even in those cases, it is preferable to use a soft material of a same degree as rubber or PTFE. By use of soft material, it is possible to change the shape of them, thereby making it easier to fit to the mounting hole 19. The sealing member 20 is fitted to the mounting hole 19 in a state in which the back up rings 29 and 30 are disposed on either sides. Both sides of the sealing member 20 are protected by the back up rings 29 and 30.

Due to the sealing function by the ball 12 and the seal mechanism 13, the valve main unit 10 is configured to seal high-pressure fluid by what is called a double sealing method, by the elastic force applied by the spring member 22 to the seat retainer 18 and an autofrettage force generated by exhibiting pressed force of the seal mechanism 13 by fluid pressure set in an inside diameter side of the sealing member 20.

The outer peripheral side of the stem 11 has a lower packing washer 33, an inside diameter sealing member 34, an outer diameter sealing member 35, a thrust bearing 36, an upper packing washer 37 that can be fitted from an upper side of the lower packing washer 33, a gland 38 and a bush 39. The stem 11 is attached rotatable inside the body 15 via these members.

The lower packing washer 33 includes a cylinder section 40 in which the inside diameter sealing member 34 that seals a space between the stem 11 is housed, and a bottom section 41 for mounting the inside diameter sealing member 34. A ring-shaped groove 42 is formed on an outer peripheral side of the cylinder section 40, and the outer diameter sealing member 35 is attached on the ring-shaped groove 42. As such, by having the inside diameter sealing member 34 be provided between the stem 11 and the lower packing washer 33, and the outer diameter sealing member 35 be provided between the lower packing washer 33 and the body 15, leakage of the high-pressure fluid from the shaft-provided part of the stem 11 is prevented.

The lower packing washer 33 is provided on an upper side of the stem 11 via the thrust bearing 36. This thus allow for the stem 11 to be rotatable with respect to the inside diameter sealing member 34 and the upper packing washer 37 via the thrust bearing 36.

The gland 38 is formed in a substantially tubular shape, and includes a ring-shaped flange section 43 into which the upper packing washer 37 and the lower packing washer 33 can be fitted, and a lid section 45 that provides a lid for the upper packing washer 37 from above. The gland 38 is attached from the upper side of the upper packing washer 37 by screwing onto a mounting recess section 46 provided on the body 15, and houses the inside diameter sealing member 34. The upper and lower packing washers 37 and 33 on which the outer diameter sealing member 35 is attached is pressed in the direction of the thrust bearing 36. The gland 38 has the bush 39 attached on an inner peripheral side thereof, and the bush 39 causes the upper packing washer 37 to be pressed against the lower packing washer 33. The bush 39 provided is made of material such as PEEK.

With such a configuration, even in a case in which high-pressure fluid flows inside the valve main unit 10 and force in a direction in which the stem 11 rises is applied due to the difference in pressure with the outer air, the inside diameter sealing member 34 is protected by the upper and lower packing washers 37 and 33, so therefore the inside diameter sealing member 34 is prevented from being crushed in the shaft direction, thereby preventing a decrease in sealing ability and securely preventing the leakage of high-pressure fluid. Therefore, it is further possible to prevent the wearing out of the inside diameter sealing member 34 and reduce the decrease in operability of the stem 11.

Moreover, the body 15 of the valve main unit 10 has a cover 50 attached, and via the cover 50, a handle cap 51 and a manual handle 52 are provided.

The cover 50 is formed in a substantially disc shape, and has on its bottom surface side a flange-like side surface section 54 that can be fitted to a ring-shaped protrusion 53 formed on an upper surface side of the body 15. The side surface section 54 has two each of a counterbore section 55 and a notch 56 in intervals of 90°, provided in an alternate manner. The cover 50 has in its center section a hole 57 for inserting the handle cap 51. The hole 57 has a regulating piece (not illustrated) formed in a protruding manner, and this regulating piece regulates the rotation of the stem 11 to within a range of 90°.

The handle cap 51 is formed in a substantially cylindrical shape with a substantially same diameter as the gland 38, and its outer peripheral side has a locking piece 59 in a protruding manner, which allows for locking with a regulating piece on the cover 50. The handle cap 51 has on its bottom side a fitting hole 51a that can fit the parallel section 11a formed on an upper end section of the stem 11. The handle cap 51 is integrated to the stem 11 by fitting the parallel section 11a into the fitting hole 51a. Moreover, the handle cap 51 has an attachment hole 60, while an attached part of the handle 52 is provided to an outer diameter that can be fitted into the attachment hole 60.

It should be noted that at the positions corresponding to the counterbore section 55 and the notch 56 on the side surface of the ring-shaped protrusion 53 of the body 15, an internal thread 61 is provided thereon. The internal thread 61 allows for a secured bolt 62 and a locking screw (not illustrated) to be screwed thereon.

The handle cap 51 is provided in a predetermined direction with respect to the stem 11 by fitting the parallel section 11a into the fitting hole 51a, and the cover 50 is fit and attached to the ring-shaped protrusion 53 from above the handle cap 51 in this state. Furthermore, the handle cap 51 is fixed by having the securing bolts 62 be screwed into the internal thread 61 via the counterbore section 55 of the cover 50 and the locking screw be screwed to the internal thread 61 via the notch 56 of the cover 50. By fitting the handle 52 into the attachment hole 60 of the handle cap 51 and fixing the handle 52 with a fixing bolt 64, the handle 52 is attached operable on an upper end side of the stem. During rotational operation of the handle 52, the locking piece 59 is regulated by being in contact with the regulating piece. This enables opening and closing operation while regulating the rotation of the stem 11 to 90°.

As such, by attaching a manual handle 52 to the upper end side of the stem, the valve main unit 10 is provided as a manual valve.

It should be noted that the trunnion ball valve for high pressure of the present invention can be automated by use of an automatic operation actuator such as a pneumatic actuator as described later, other than attaching a manual handle as described above.

Next described is an effect of a trunnion ball valve for high pressure of the present invention in the above embodiment.

The trunnion ball valve for high pressure of the present invention exhibits sliding ability and sealing performance by providing a coating layer 31 of diamond-like carbon to at least both of the sealing surface 18a of the seat retainer 18 and the ball surface 12a with which the sealing surface 18a is in contact. Accordingly, it is possible to maintain the sliding ability achieved by high surface pressure when high-pressure fluid such as high pressure hydrogen gas flows to prevent any damage on any sides of the seat retainer 18 and the ball 12, while securing low torque and sealing ability for improving operability while securely preventing leakage. By providing the coating layer 31 having a DLC film thickness of 2 to 3 μm, it is possible to maintain ultraprecision machining of the base material such as sphericity and finished roughness even after the coating process.

The sealing surface 18a is configured so that a part of a semispherical surface S drawn so as to have a radius R slightly longer than a radius $R_B$ of the ball surface 12a in an angle of 180° in a direction opposite to the offset side, from the offset point Q offset in a predetermined distance H in a Y-axis direction that intersects with an X-axis (in the flow channel direction of the ball 12 from the spherical diameter center P of the ball surface 12a), serves as a trajectory surface. Therefore, the sealing position T on the sealing surface 18a with the ball surface 12a is made to be in a substantially center position of the sealing surface 18a, so as to prevent the ball surface 12a from being in contact with the sealing surface 18a in an inclined state to improve the sealing ability by pressure welding the ball surface 12a to the sealing surface 18a, thereby securely preventing leakage.

Even in a case in which DLC wears out, the base material hardness of the seat retainer 18 is set higher than the base material hardness of the ball 12 to improve the durability of the seat retainer 18 and allowing for preventing any damage caused by galling due to rotation of the ball 12 and the like. As a result, high sealing ability is exhibited.

Furthermore, by making the base material of the seat retainer 18 be BeCu alloy and the base material of the ball 12 be stainless steel, employment of such metal seat allows for reducing a given effect caused by temperature change of hydrogen, thereby improving durability. Even in a case in which the DLC coating layer 31 wears out, leakage can be avoided by a beryllium layer of the BeCu alloy, that is the base material of the seat retainer 18.

The conforming layer 32 is provided on the surface of the coating layer 31 on either one or both of the sealing surface 18*a* and the ball surface 12*a*. This increases the conformability between the sealing surface 18*a* and the ball surface 12*a*, thereby preventing wearing due to abrasion while improving sliding ability. Furthermore, the degree of adhesion improves by the conforming layer 32, thereby improving the sealing ability.

The valve main unit 10 of the present invention sets fluid pressure on the inside diameter side of the seat retainer 18 of the seal mechanism 13. Accordingly, it is possible to obtain the following autofrettage force.

Figure 5:
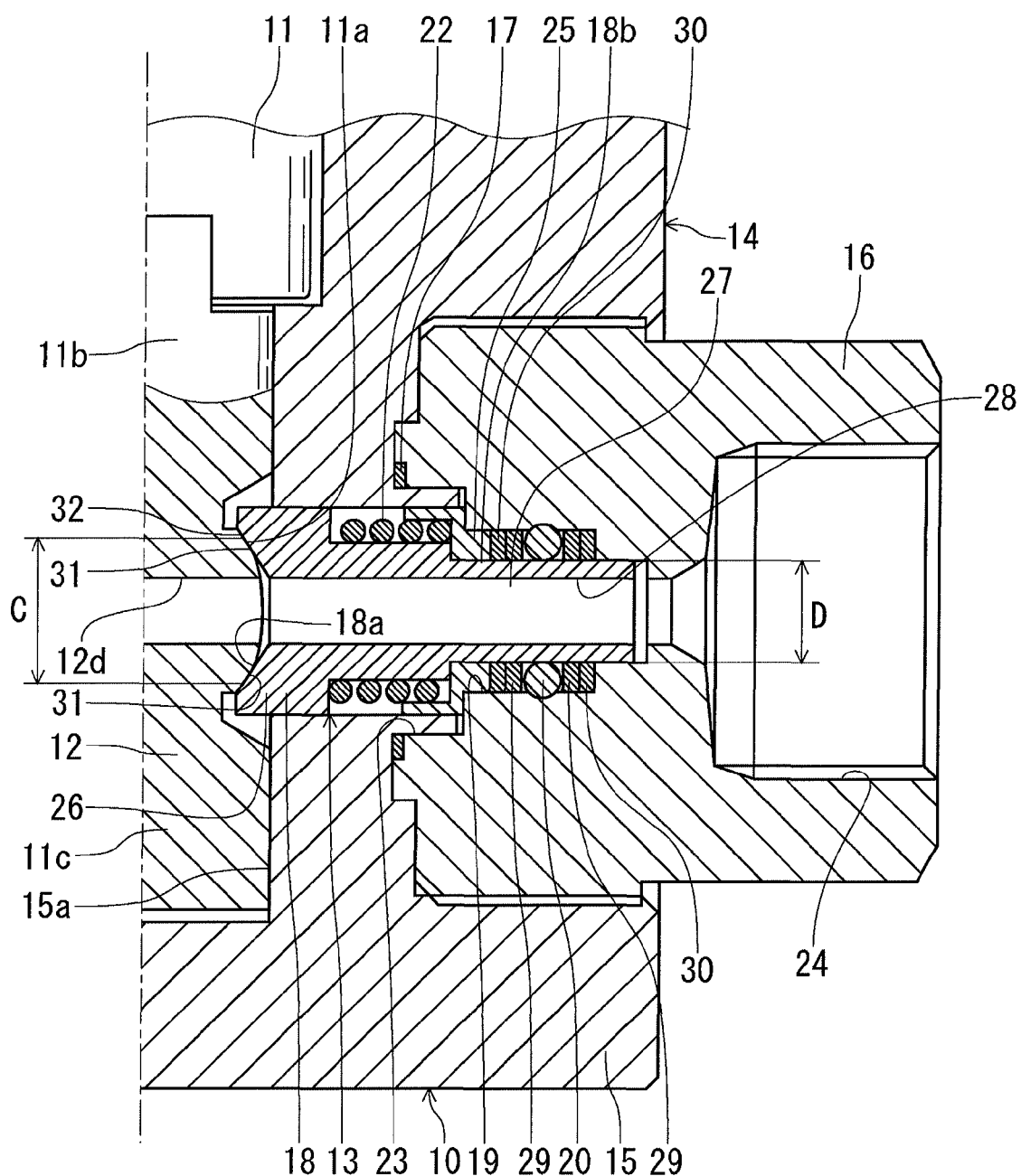
FIG. 5 is an enlarged cross sectional view of one part of FIG. 1.

In FIG. 1 and FIG. 5, suppose that a left side of the seat retainer 18 is named a primary side and a right side thereof is named a secondary side. In this case, at a time in which fluid flows from the primary side to the secondary side as illustrated by the arrows in FIG. 1, the following relationship is set, provided that an inside diameter $\phi A$ is of the sealing surface 18*a*, an inside diameter $\phi D$ is of the sealing member 20, an outer diameter $\phi C$ is of the sealing surface 18*a*, and an outer diameter $\phi B$ is of the sealing member 20: inside diameter $\phi D$<inside diameter $\phi A$<outer diameter $\phi C$<outer diameter $\phi B$. Therefore, regarding the autofrettage force on the primary side, the seat retainer 18 is pressed to the ball 12 by fluid pressure inside the flow channel applied on an area of inside diameter $\phi D$–inside diameter $\phi A$ while the valve is closed.

On the other hand, regarding the autofrettage force on the secondary side, the seat retainer 18 is pressed to the ball 12 by fluid pressure inside a cavity applied on an area of outer diameter $\phi C$–inside diameter $\phi D$.

As from the above, the trunnion ball valve for high pressure of the present invention can securely seal high-pressure fluid by exhibiting excellent self-sealing abilities attained by synergy of the double sealing method of the elastic force of the spring member 22 described above and the autofrettage force.

Figure 6:
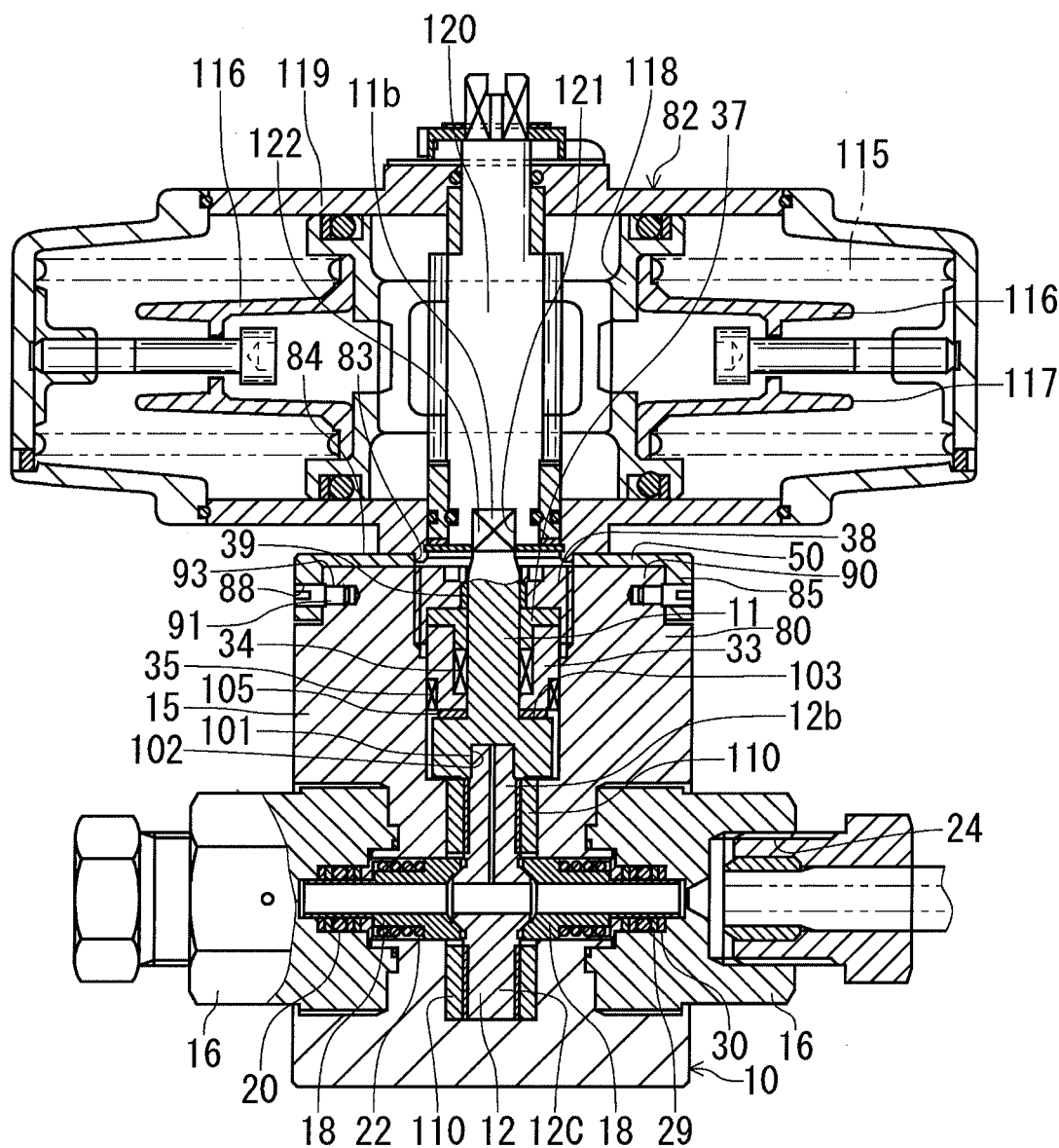
FIG. 6 is a longitudinal sectional view illustrating another embodiment of a trunnion ball valve for high pressure of the present invention.
Figure 7:
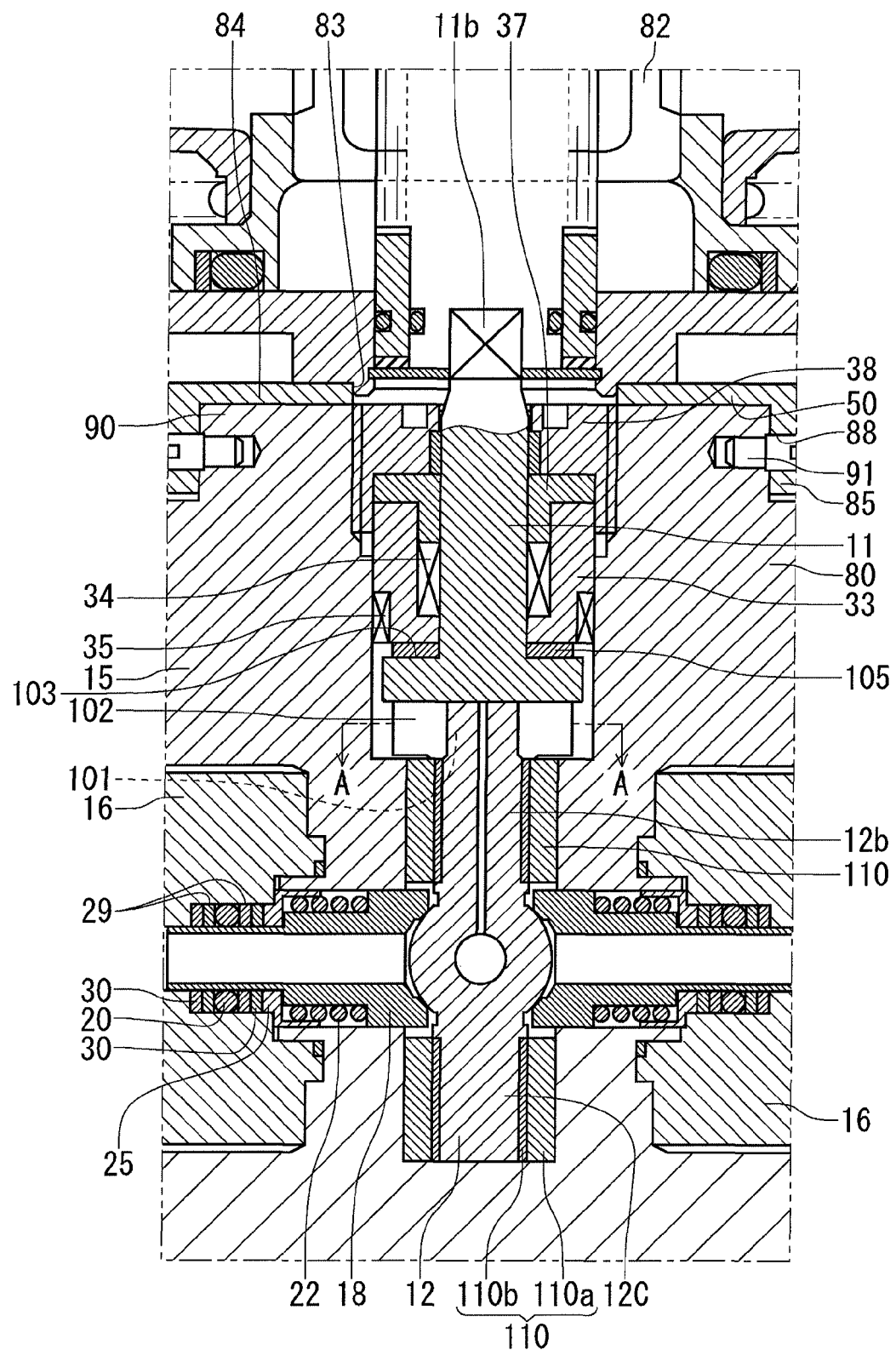
FIG. 7 is an enlarged cross sectional view of a main part illustrating a closed state of the trunnion ball valve for high pressure illustrated in FIG. 6.
Figure 8:
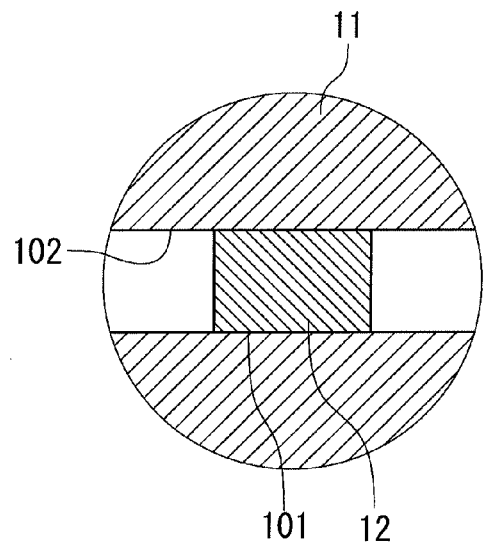
FIG. 8 is an enlarged cross sectional view taken along line A-A of FIG. 7.

FIG. 6 illustrates a second embodiment of a trunnion ball valve of the present invention, FIG. 7 illustrates a main part of FIG. 6, and FIG. 8 illustrates a cross section of line A-A in FIG. 7. The drawings illustrate a fitted state of the stem and the ball. It should be noted that in this embodiment, parts identical to the above embodiment are represented by identical reference signs, and explanations thereof are omitted.

The trunnion ball valve for high pressure of this embodiment provides the ball 12 in an integrated manner with the upper shaft section 12*b* and the lower shaft section 12*c* as like the above embodiment, as illustrated in FIG. 7. The ball 12 is disposed rotatable via radial bearings 110, 110 on an outer periphery of the upper shaft section 12*b* and the lower shaft section 12*c*.

As illustrated in FIG. 7, the radial bearings 110 are coated with a soft member 110*b* such as polytetrafluoroethylene (PTFE) on an inner surface of a rigid cylindrical body 110*a* such as stainless steel. By supporting the ball 12 with the radial bearings 110 as such, torque can be maintained and durability can be improved even if a large force is applied to the ball 12 in a radial direction by the high-pressure fluid. In this case, the upper shaft section 12*b* and the lower shaft section 12*c* of the ball 12 are supported by a pair of the cylindrical radial bearings 110, 110. The radial bearings 110 are set as a long shape that supports from the vicinity of a spherical section of the ball 12 to the vicinity of the stem connection section. By dispersing load applied around the spherical section of the ball 12 up to the vicinity of the stem connection section by the long radial bearings 110, breakage of the bearings is prevented. Therefore, a durable ball valve for high pressure is attained. Although the present embodiment is of a top-entry type structure in which the ball 12 is inserted from the upper section of the body 15, the present invention is applicable to a bottom-entry type in which the ball 12 is inserted from the lower section of the body 15.

The stem 11 is joined to the upper shaft section 12*b* of the ball 12, and the ball 12 is provided so as to be rotatable through the rotational force of the stem. The stem 11 has a sliding surface 103 in a thrust direction, and a thrust bearing 105 is provided between the sliding surface 103 and the lower packing washer 33. The thrust bearing 105 is a member on which PTFE is coated on a rigid plate, such as a thin stainless steel plate knot illustrated). The sliding surface 103 and the lower packing washer 33 of the stem 11 are to be in contact with the PTFE. The stem 11 is made to be a bearing in the thrust direction via the thrust bearing 105.

As illustrated in FIG. 7 and FIG. 8, a parallel two-surface groove 102 is provided on a lower end of the stem 11. The parallel two-surface groove 102 is provided so as to be cut out in a direction on which a load is received while the valve of the ball 12 is closed, that is to say, in a horizontal direction in FIG. 7. Meanwhile, a parallel two-surface section 101 that can be joined to the parallel two-surface groove 102 is provided on an upper end of the upper shaft section 12*b* of the ball 12. The stem 11 and the ball 12 are provided so as to be capable of operating together by the joint parallel two-surface groove 102 and parallel two-surface section 101. Upon pressing the ball 12 with the high-pressure fluid while the valve is closed, the stem 11 is made to support the ball 12 by having the upper shaft section 12*b* and lower shaft section 12*c* in the secondary direction in a perpendicular state via the radial bearings 110.

In a case in which pressure of the high-pressure fluid is applied on the ball 12 while the valve is closed, although the upper shaft section 12*b* and the lower shaft section 12*c* of the ball 12 is supported by the radial bearings 110 as described above, the ball slightly moves in a parallel manner with respect to the stem 11 via the parallel two-surface section 101 and the parallel two-surface groove 102. This allows for preventing position shifting of the inside diameter sealing member 34 that is a packing for sealing the stem 11 and maintains a set position, thereby preventing the stem 11 from inclining. Therefore, sealing function on the outer peripheral side of the stem 11 by the inside diameter sealing member 34 is exhibited effectively. Accordingly, it is possible to securely prevent the leakage from the stem 11 caused by the high-pressure fluid, and even if rotational movement of the ball 12 is repetitively carried out, the durability and torque as a valve and the sealing ability by the inside diameter sealing member 34 and the outer diameter sealing member 35 can be maintained.

The thrust bearings 105 and the radial bearings 110 are determined in position and fixed, by being pushed from an upper side by the gland 38 screwed to the body 15. At this time, an upper side of the stem 11 is supported by the bush 39 for pressing, which bush is attached on the inner peripheral side of the gland 38, and the inside diameter sealing member 34 and outer diameter sealing member 35 are attached to their set positions.

It should be noted that although the present embodiment describes a case in which a recessed parallel two-surface groove 102 is formed on the stem 11 and a projecting parallel two-surface section 101 is formed on the ball 12, the recess and projecting relationship can be opposite, that is to say, the stem 11 may have the projecting parallel two-surface section and the ball 12 may have the recessed parallel two-surface groove.

Figure 9:
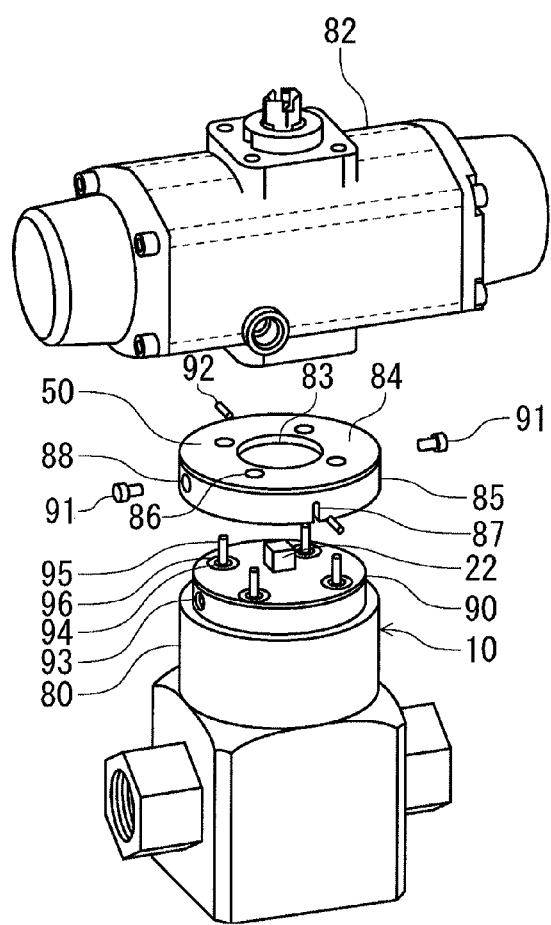
FIG. 9 is an exploded perspective view illustrating the ball valve and actuator illustrated in FIG. 6.

Furthermore, the trunnion ball valve for high pressure has, as illustrated in FIG. 6 and FIG. 9, a pneumatic actuator 82 for automatic operation, on the stem upper end 11b.

The trunnion ball valve for high pressure of the present invention can be a manually operated ball valve in which a handle 52 for manual operation is provided on the upper end 11b of the stem 11 as described above, or can be an automatically operated ball valve in which the upper end 11b of the stem 11 is connected to an automatically operating actuator 82 mounted on the body 15.

The actuator 82 is attached to the body 15 via the cover 50. The actuator 82 allows for accurately controlling rotation of the ball 12 supported in a perpendicular state in the secondary direction, by a predetermined torque.

The cover 50 is composed of a substrate 84 having an attachment opening 83, and a hanging plate 85. The substrate 84 has a bolt passage hole 86, and the hanging plate 85 has a position determination groove 87 and a counterbore hole 88 each opened at intervals of 90° in an alternate manner. Accordingly, the position determination groove 87 and the counterbore hole 88 are provided in two positions each with respect to the hanging plate 85.

An outer periphery of an upper part of the shaft mounting section 80 of the body 15 in the ball valve main unit 10 has a notch provided in a ring shape, thereby forming a ring-shaped protrusion 90. On an outer surface of the ring-shaped protrusion 90, four internal thread sections 93 each in which a valve fixing bolt 91 and an attachment pin 92 can be screwed are provided at intervals of approximately 90°, at even positions. A housing groove 94 is provided on an upper surface of the ring-shaped protrusion 90, and the housing groove 94 is capable of housing a head 96 of an actuator fixing bolt 95 for fixing the actuator 82 to the cover 50.

On a lower side of the actuator 82, a ring-shaped protrusion 97 is formed that can be fitted into the attachment opening 83 opened on the cover 50, and on the bottom surface side of the actuator 82, an internal thread not illustrated is provided, which internal thread allows for screwing an actuator fixing bolt 95 therein.

In a case in which the actuator 82 is attached to the ball valve main unit 10, first, screw fix the attachment pin 92 onto the internal thread section 93 of the shaft mounting section 80. In this case, fix the attachment pins 92, 92 to two internal thread sections 93 facing each other among the four internal thread sections 93 formed at intervals of 90°.

Meanwhile, fit the ring-shaped protrusion 97 of the actuator 82 into the attachment opening 83 to determine its position, and insert the actuator fixing bolt 95 through the bolt passage hole 86 and screw the actuator fixing bolt 95 to the internal thread. This fixes the cover 50 by screwing at a predetermined attachment position of the actuator 82.

Next, attach the cover 50 integrated with the actuator 82 to the ball valve main unit 10. In this case, the actuator 82 is mounted on a predetermined position of the shaft mounting section 80 by locking the attachment pin 92 provided on an outer surface of an upper part of the shaft mounting section 80 to the position determination groove 87 to determine and fix its position, while fitting the ring-shaped protrusion 90 to the inner periphery of the hanging plate 85, and thereafter placing the cover 50 on the upper surface of the shaft mounting section 80. At this time, a projected section 122 formed on an upper end of the stem 11 is fitted to a recess section 121 formed on a lower edge of the output shaft 120 provided on the actuator 82, to connect the output shaft 120 with the stem 11. Moreover, the head 96 of the actuator fixing bolt 95 is housed in a housing groove 94 on the upper surface of the shaft mounting section.

In this state, the valve fixing bolt 91 is screwed onto the internal thread section 93 from the hanging plate 85, to determine the position of and fix the cover 50 to the ball valve main unit 10, and via this cover 50, it is possible to accurately determine the position of and fix the actuator 82 to the predetermined position of the ball valve main unit 10. While the actuator 82 is operating, it is possible to accurately open and close the ball 12. It should be noted that the valve fixing bolt 91 can be provided at four positions, instead of the position determination pin.

The actuator 82 is what is called a spring return type. A spring member 115 is provided inside, and a retainer member 116 is provided to prevent the springing out of the spring member 115. The retainer member 116 has a projecting striking section 117, and when a piston 118 provided inside reciprocates inside a cylinder 119, this striking section 117 comes into contact with both sides inside the cylinder 119. This regulates a stroke (not illustrated) of the piston 118, and regulates a rotational angle of the output shaft 120 to a predetermined angle, that is to say, to 90°.

Figure 11:
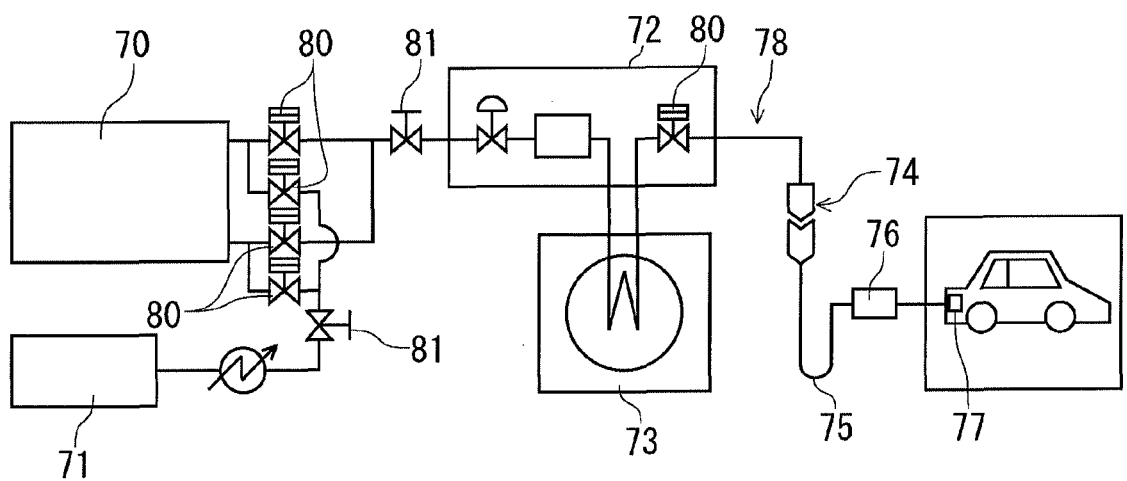
FIG. 11 is a block diagram illustrating a hydrogen station.

FIG. 11 illustrates a hydrogen station in which a trunnion ball valve for high pressure of the present invention is provided. The hydrogen station includes an accumulator 70, a compressor 71, a dispenser 72, a precooling heat exchanger 73, a quick joint 74, a filling hose 75, a filling nozzle 76, and an in-vehicle tank 77, and these components constitute a system as a supply line 78 for high pressure hydrogen.

Figure 10:
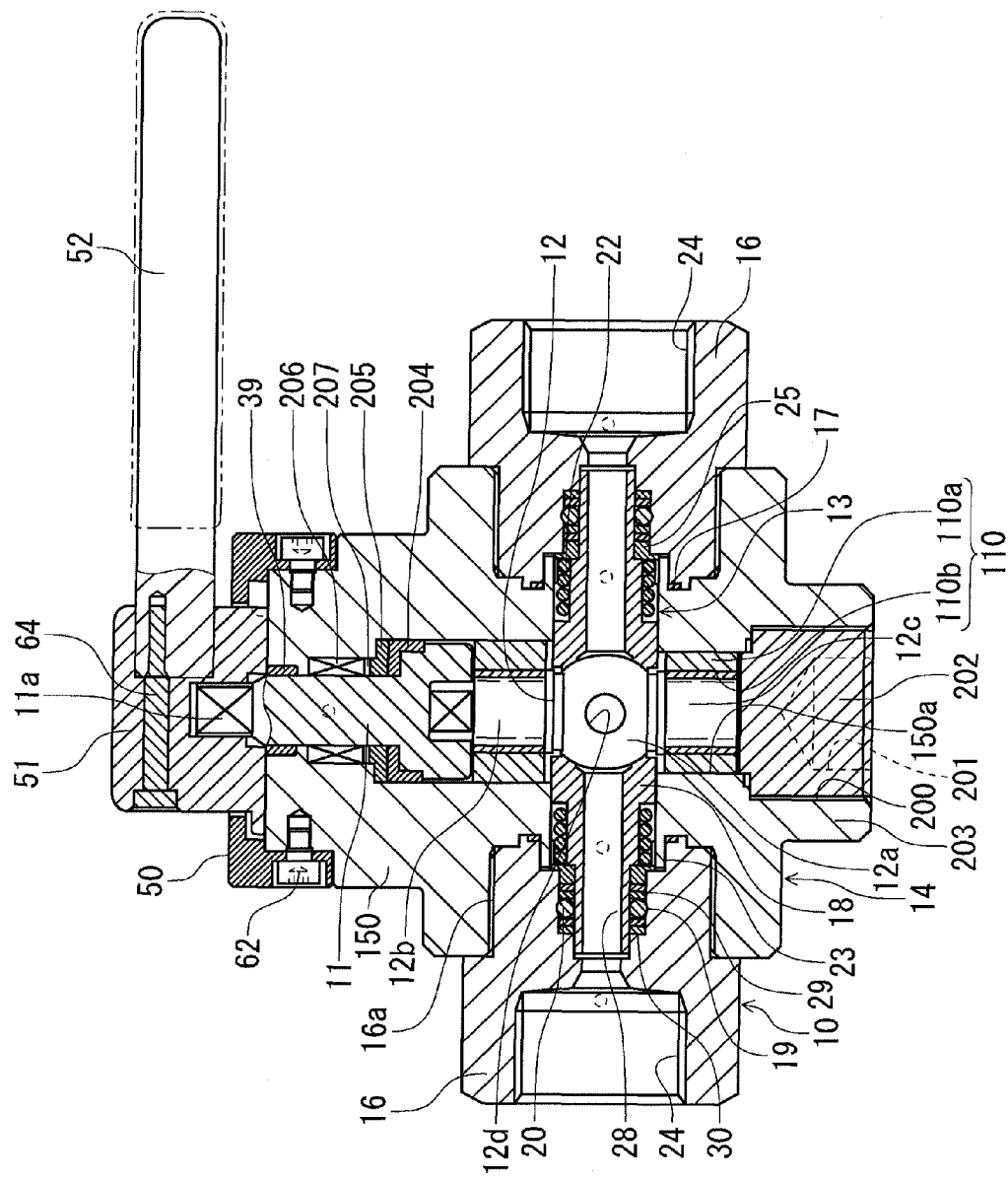
FIG. 10 is a longitudinal sectional view illustrating another embodiment of a trunnion ball valve for high pressure of the present invention.

The ball valve of the present invention has small pressure loss. Therefore the pressure loss of the entire system is reduced by providing the ball valve on a secondary side of the accumulator 70 or by providing the ball valve on other supply lines, and is suitable for a system illustrated in FIG. 10. As illustrated in FIG. 10, a manual valve 81 is provided on connection parts of each unit in the hydrogen station, and an automated valve 80 is appropriately provided on a primary or secondary side of each unit to control the opening and closing thereof.

The accumulator 70 includes a plurality of separate tanks inside. By appropriately switching between valves 80 that connect the tanks with the compressor 71 and valves 80 that connect the tanks with the dispenser 72, hydrogen is supplied to the dispenser from a tank with a predetermined pressure, while tanks having a lower pressure than a predetermined low limit pressure are filled with hydrogen from the compressor 71 to achieve the predetermined pressure.

As illustrated in the supply line 78 in the block diagram of the hydrogen station in FIG. 6, the supply of hydrogen in the system is controlled by a predetermined program, and the supply of hydrogen is controlled as appropriate in accordance with a vehicle supplied amount.

FIG. 10 is a longitudinal sectional view illustrating another embodiment of the trunnion ball valve for high pressure.

FIG. 1 illustrates a top-entry type ball valve, whereas FIG. 10 illustrates a bottom-entry type ball valve. The ball valve configuration illustrated in FIG. 10 includes identical configurations as the configuration of the ball valve illustrated in FIG. 1 to FIG. 9, and such identical parts are represented by identical reference signs and their explanations are omitted.

In FIG. 10, the cap members 16, 16 are fixed by screwing onto the primary side and secondary side of a body 150, respectively, each via a screwing section 16a. Moreover, to an attachment hole 150a of the body 150, a ball having a stem 11, an upper shaft section 12b and a lower shaft section 12c is inserted from a bottom side of the body 150. The ball is fixed to a protrusion 203 of the body 150 via a screwing section 200 by use of a fixing screw 202 that has a fastening section 201, to configure a bottom-entry type ball valve. In this case, in a gap between the stem 11 and the attachment hole 150a in which the ball 12 is inserted, for example, a packing 206 having a cross section of a substantially U-shape, a metal bush 205, a bearing 204, and radial bearings 110 (110a, 110b) are attached, and 207 in the drawing illustrates space.

With the bottom-entry type trunnion ball valve for high pressure of the present embodiment, it is possible to simplify the sealing configuration of the stem 11 as compared to the top-entry type, thereby allowing to provide a further compact and firm ball valve.

Examples

A hydrogen durability test was conducted to the ball 12 and the seat retainer 18 of the trunnion ball valve for high pressure of the present invention, and their durability were compared. At this time, the ball 12 was operated to open and close while high-pressure fluid whose heat cycle was at temperatures in a range of −40° C. to 85° C. was flown, under temperature of normal temperature, low temperature (−40° C.), and high temperature (85° C.). Hydrogen gas was used as the high-pressure fluid.

The ball 12 was operated to open and close 40,000 times under the conditions. As a result, no abnormalities were found in either of the sliding ability or sealing performance. Although a pressure difference of 90 MPa occurred when high-pressure fluid was flown, an operation torque at this time was held down to for example 9.4 N·m, which is a rated pressure of the actuator. Accordingly, it can be said that high operability was maintained.

INDUSTRIAL APPLICABILITY

The present invention is particularly used suitably in piping facilities such as a hydrogen station in which high-pressure fluid hydrogen and the like that is used in fuel cells flows, however the present invention can exhibit excellent sealing ability and torque for any pipeline through which high-pressure fluid flows. For example, the present invention is suitable for a valve in a CNG (Compressed Natural Gas) station, or alternatively as a ball valve for high pressure that is used in various locations through which high-pressure fluid flows, such as a pipeline valve.

REFERENCE SIGNS 10 ball valve main unit
11 stem
12 ball
12a ball surface
12b shaft section (upper shaft section)
12c trunnion (lower shaft section)
13 seal mechanism
14 body main unit
18 seat retainer
18a sealing surface
18b outer surface
20 sealing member
22 spring member
31 coating layer (diamond-like carbon)
32 conforming layer
52 handle
82 actuator
101 parallel two-surface section
102 parallel two-surface groove
103 sliding surface
110 radial bearing
110a rigid cylindrical body
H distance
P spherical diameter center
Q offset point
R seat
$R_B$ ball surface radius
S semispherical surface
T sealing position

The invention claimed is:

1. A trunnion ball valve for high pressure, comprising:
a ball provided inside a body main unit in a freely rotatable manner; and
a seal mechanism provided on positions on both sides of the ball so as to be in seal contact with the ball,
the seal mechanism comprising:
a seat retainer of a tubular shape having a sealing surface that is to be in seal contact with a ball surface of the ball;
a spring member provided for applying elastic force such that the elastic force is applied on a sealing surface side; and
a sealing member provided on an outer surface of the seat retainer,
wherein the sealing surface of the seat retainer is set at a position deviated from a spherical diameter center of the ball surface so that the sealing surface has a slightly longer radius than a radius of the ball surface, and the sealing surface has a sealing position with the ball surface at a substantially center position of the sealing surface.

2. The trunnion ball valve for high pressure as set forth in claim 1, wherein the seat retainer has a base material hardness set higher than a base material hardness of the ball.

3. The trunnion ball valve for high pressure as set forth in claim 2, wherein the base material of the seat retainer is BeCu alloy, and the base material of the ball is stainless steel.

4. The trunnion ball valve for high pressure as set forth in claim 1, wherein either one or both of the sealing surface and the ball surface has a conforming layer provided on a surface of a coating layer.

5. The trunnion ball valve for high pressure as set forth in claim 1, wherein the ball has an upper shaft section and a lower shaft section provided in an integrated manner, the ball being provided on an outer periphery of the upper shaft section and the lower shaft section in a freely rotatable manner via a radial bearing, and the ball being provided in a freely rotatable manner via a rotational force of a stem that is joined to the upper shaft section, the stem having on a lower end thereof a parallel two-surface groove on which a parallel two-surface section provided on an upper end of the upper shaft section is provided to work in connection therewith, and when the ball is pressed by high-pressure fluid while the trunnion ball valve is closed, the ball having the upper shaft section and the lower shaft section is supported in a perpendicular state in a secondary direction.

6. The trunnion ball valve for high pressure as set forth in claim 5, wherein the radial bearing is a member in which an inner peripheral surface of a rigid cylindrical body is coated with polytetrafluoroethylene.

7. The trunnion ball valve for high pressure as set forth in claim 5, wherein the trunnion ball valve is a manually operated ball valve to which a handle for manual operation is provided on an upper end of the stem, or is an automatically operated ball valve in which the upper end of the stem is connected to an actuator installed in the body main unit for automated operation.

8. A hydrogen station comprising a trunnion ball valve for high pressure as set forth in claim 1, in a supply line for high pressure hydrogen.

9. A trunnion ball valve for high pressure, comprising:
a ball provided inside a body main unit in a freely rotatable manner; and
a seal mechanism provided on positions on both sides of the ball so as to be in seal contact with the ball,
the seal mechanism comprising:
a seat retainer of a tubular shape having a sealing surface that is to be in seal contact with a ball surface of the ball;
a spring member provided for applying elastic force such that the elastic force is applied on a sealing surface side; and
a sealing member provided on an outer surface of the seat retainer,
wherein the sealing surface of the seat retainer has one part of a drawn semispherical surface serving as a trajectory surface, the semispherical surface being drawn to have a slightly longer radius than that of the ball surface, the slightly longer radius being a length from a point deviated from a spherical diameter center of the ball surface along a Y-axis direction by a predetermined distance, at an angle 180° in a direction opposite to a side to which the point is deviated, the Y-axis running orthogonally to an X-axis that runs in a flow channel direction of the ball.

10. The trunnion ball valve for high pressure as set forth in claim 9, wherein the seat retainer has a base material hardness set higher than a base material hardness of the ball.

11. The trunnion ball valve for high pressure as set forth in claim 10, wherein the base material of the seat retainer is BeCu alloy, and the base material of the ball is stainless steel.

12. The trunnion ball valve for high pressure as set forth in claim 9, wherein either one or both of the sealing surface and the ball surface has a conforming layer provided on a surface of a coating layer.

13. The trunnion ball valve for high pressure as set forth in claim 9, wherein the ball has an upper shaft section and a lower shaft section provided in an integrated manner, the ball being provided on an outer periphery of the upper shaft section and the lower shaft section in a freely rotatable manner via a radial bearing, and the ball being provided in a freely rotatable manner via a rotational force of a stem that is joined to the upper shaft section, the stem having on a lower end thereof a parallel two-surface groove on which a parallel two-surface section provided on an upper end of the upper shaft section is provided to work in connection therewith, and when the ball is pressed by high-pressure fluid while the trunnion ball valve is closed, the ball having the upper shaft section and the lower shaft section is supported in a perpendicular state in a secondary direction.

14. The trunnion ball valve for high pressure as set forth in claim 13, wherein the radial bearing is a member in which an inner peripheral surface of a rigid cylindrical body is coated with polytetrafluoroethylene.

15. The trunnion ball valve for high pressure as set forth in claim 13, wherein the trunnion ball valve is a manually operated ball valve to which a handle for manual operation is provided on an upper end of the stem, or is an automatically operated ball valve in which the upper end of the stem is connected to an actuator installed in the body main unit for automated operation.

16. A hydrogen station comprising a trunnion ball valve for high pressure as set forth in claim 9, in a supply line for high pressure hydrogen.

* * * * *